United States Patent [19]
Maxwell

[11] Patent Number: 5,661,924
[45] Date of Patent: Sep. 2, 1997

[54] METHOD AND APPARATUS FOR STORING AND HANDLING LIVE BAIT

[76] Inventor: Marjorie Maxwell, 1165 W. Farm Rd. 56, Springfield, Mo. 65803

[21] Appl. No.: 529,951

[22] Filed: Sep. 15, 1995

[51] Int. Cl.⁶ .................................................. A01K 97/05
[52] U.S. Cl. ............................................. 43/55; 43/56
[58] Field of Search ................................. 43/55, 56, 57

[56] References Cited

U.S. PATENT DOCUMENTS

| | | | |
|---|---|---|---|
| 1,110,892 | 9/1914 | Cather | 43/56 |
| 1,610,579 | 12/1926 | Nichols | 43/56 |
| 1,745,012 | 1/1930 | Gilmore | 43/56 |
| 2,055,912 | 9/1936 | Schonger | 43/56 |
| 2,497,014 | 2/1950 | Renfro, Sr. | 43/57 |
| 2,628,447 | 2/1953 | Brown | 43/57 |
| 2,678,512 | 5/1954 | Maston | 43/57 |
| 2,731,760 | 1/1956 | Ebert | 43/57 |
| 2,734,305 | 2/1956 | Hannah | 43/56 |
| 3,319,372 | 5/1967 | Wright | 43/56 |
| 3,348,330 | 10/1967 | Gilliam | 43/57 |
| 4,570,374 | 2/1986 | Baxley | 43/55 |
| 4,606,143 | 8/1986 | Murphy | 43/56 |
| 4,864,769 | 9/1989 | Sandahl | 43/55 |

FOREIGN PATENT DOCUMENTS 741644  2/1933  France .

OTHER PUBLICATIONS

Sharp, Hal, *Sportsman's Digest of Fishing*, p. 196, 1953. (no month known).
*Popular Mechanics*, vol. 94, issue 1, p. 182, Jul. 1950.
*Popular Mechanics*, p. 96, Aug. 1943.

*Primary Examiner*—Joseph J. Hail, III
*Assistant Examiner*—Jay A. Stelacone
*Attorney, Agent, or Firm*—Hovey, Williams, Timmons & Collins

[57] ABSTRACT

A bait storage system includes a pail-shaped bait container having a lid for closing off the open top of the container, a flexible cover composed of a mesh material, and structure for releasably securing the peripheral edge of the cover about the side wall of the container. The edge of the cover is shiftable between a number of positions along the container wall below the open top. The peripheral edge may be shifted towards the bottom of the container wherein the cover is pulled tautly over the lid and a portion of the container so that the cover retains the lid on the container. If desired, the lid may be removed and the tautly drawn cover functions as a strainer to retain the bait within the container as the water is replaced. Alternatively, the peripheral edge may be shifted towards the top of the container allowing formation of a well of the cover within the container for storing bait and facilitating removal of the bait from the container.

24 Claims, 1 Drawing Sheet

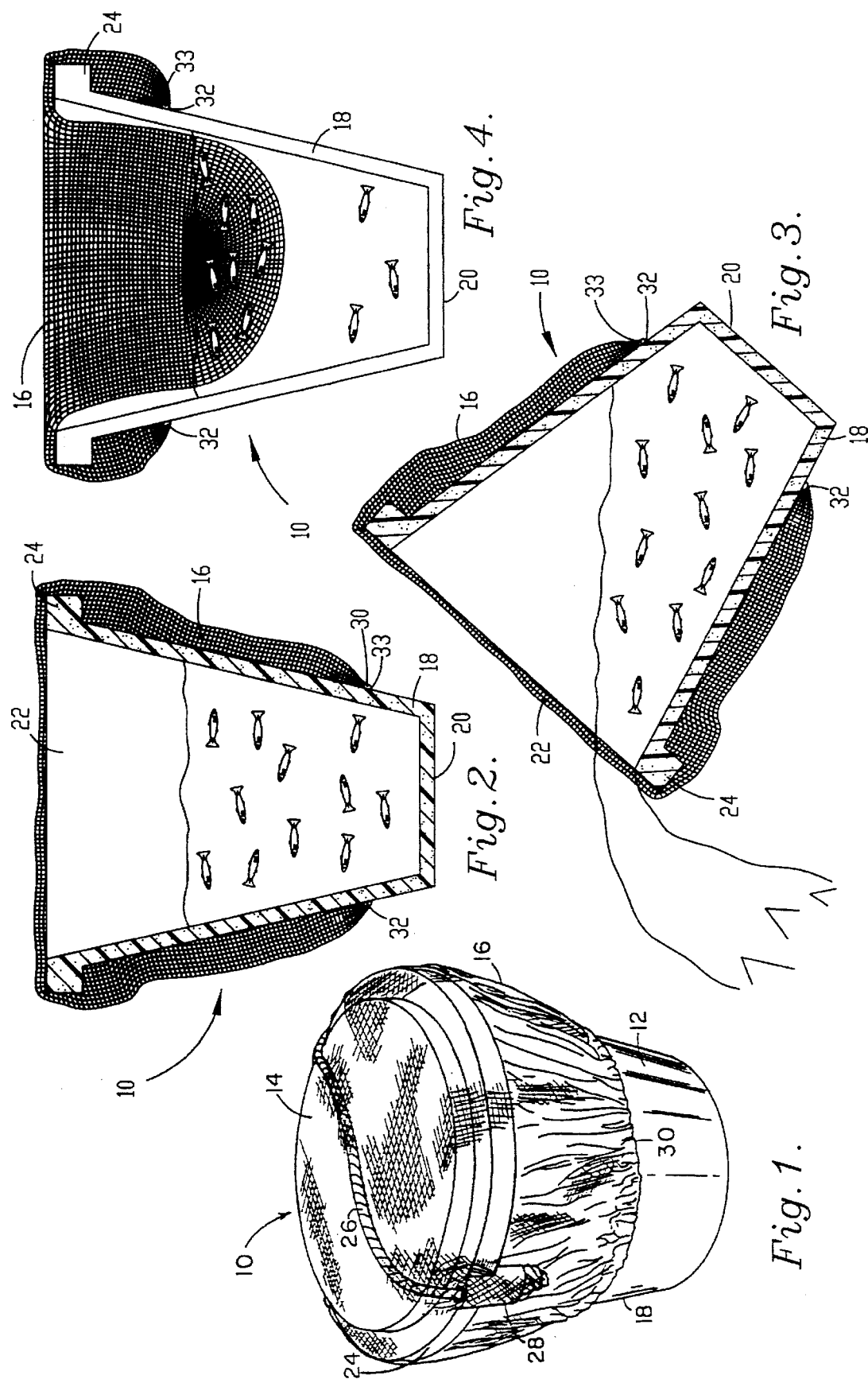

METHOD AND APPARATUS FOR STORING AND HANDLING LIVE BAIT

BACKGROUND OF THE INVENTION

1. Field of the Invention

The present invention relates generally to sport fishing equipment. More particularly, the invention is concerned with a pail-shaped bait container in combination with a flexible cover composed of a mesh material having structure for securing the peripheral edge of the cover to the container. The cover is configured to retain the lid on the container, to form a well within the container to facilitate removal of bait from the container, and to strain the bait out of the water poured from the container so that the water may be replaced without risking loss of the bait stored therein.

2. Discussion of Prior Art

One of the most established and common practices in the sport of fishing is to utilize live bait to attract the prize catch. Consequently, bait containers are an essential component of a fisherman's tackle. Conventional live bait containers have taken a variety of shapes and sizes. However, a typical container presents a pail-shape and has a lid for closing the open top of the container. Traditionally, a bait container is commonly formed of styrofoam or some other light-weight, yet durable material. These relatively light lids are often blown off by strong winds, such as during transport in the back of a pick-up truck. Further, such lightweight containers have a definite propensity to tip over, spilling the contents of the container. When a container tips over in the passenger compartment or trunk of a vehicle releasing its contents into the vehicle, some of spilled bait may elude the fisherman causing an undesirable odor in the vehicle. Similarly, when placed on a dock or uneven ground, a tipped container releases the bait into the lake or surrounding ground. Since live bait is expensive and by its nature evasive, it is highly undesirable to spill the contents of the container.

Additionally, in situations involving minnows or other naturally evasive live bait, the size and rigid walls of traditional containers tend to hinder ready removal of the bait from the container. In order to retrieve bait from the container, a fisherman may have to aggressively pursue the bait often resulting in injury or death to the bait, which is clearly afoul of the use of live bait. Further, in situations involving minnows or other live bait indigenous to water, it is necessary to periodically replace the water within the container. Replacing water in conventional bait containers without losing some or all of the bait contained therein has proven arduous.

Bait containers have been provided with a flexible netting which may be drooped interiorly of the container to form a well within which the bait may be stored, thereby limiting the area in which the bait may elude the fisherman and allowing the fisherman to manipulate the netting as necessary to facilitate removal of the bait. Additionally, the netting may be used to strain the bait from the water poured out of the container so that the bait is retained in the container as the water is replaced. However, these conventional nettings are attached to the container in such a manner that the amount of netting drooping within the container is not adjustable; thus preventing the fisherman from varying the size of the well.

Accordingly, there is a need to provide netting to retrofit existing containers so that such containers may also provide the well-forming and water-straining features. There is also a need for a netting attachment that allows the size of the well formed thereby to be adjustable by the fisherman. Further, there is a need for retaining a lid on a bait container, which is susceptible to removal by strong winds or slight tilting of the container. Finally, there is a need for containing the bait when the container tips over and spills its contents so that the bait is not lost.

SUMMARY OF THE INVENTION

Responsive to the problems identified hereinabove, the present invention includes a bait container having a top, a side wall and a bottom wall, and a flexible cover composed of a mesh material and presenting a peripheral edge which may be positioned about the sidewall of the container and shifted along the side wall between a number of positions. The invention further includes structure for releasably securing the peripheral edge of the cover about the side wall of the container and maintaining the edge in the various positions. The peripheral edge may be sufficiently shifted towards the bottom wall to a taut position in which the cover is drawn taut over the top and at least a portion of the side wall of the container. With the peripheral edge in the taut position, the cover may serve as a means for retaining the lid on the container. If the lid is not interposed between the cover and top of the container, the tautly drawn net may also be used to retain bait within the container during replacement of the water. Alternatively, the peripheral edge may be sufficiently shifted towards the top of the container to a well-forming position in which a well of the cover may be formed within the container for storing bait therein and facilitating removal of bait from the container.

Preferably, the structure for releasably securing the peripheral edge of the cover about the container includes an elastomeric band coupled with the cover along its peripheral edge. Further, the band cooperates with a frustum-shaped, downwardly tapering side wall of the container to prevent upward slippage of the peripheral edge out of the desired positions. Finally, the preferred container has a lip projecting outwardly from the side wall adjacent the open top thereof to prevent the band from slipping off the side wall altogether.

BRIEF DESCRIPTION OF THE DRAWINGS FIGURES

A preferred embodiment of the invention is described in detail below with reference to the attached drawing figures, wherein:

FIG. 1 is a perspective view of the preferred apparatus constructed in accordance with the present invention showing the cover in the lid-retaining position;

FIG. 2 is vertical cross-sectional view of the apparatus of FIG. 1 showing the cover in the water-replacing position;

FIG. 3 is a vertical cross-sectional view of the apparatus of FIG. 2 showing the container tilted for pouring water from the container; and FIG. 4 is a vertical cross-sectional view of the apparatus of FIG. 1 showing the cover in the well-forming position.

DETAILED DESCRIPTION OF THE PREFERRED EMBODIMENT

FIG. 1 is a perspective view of the preferred apparatus 10 for storing and handling live bait, such as minnows, grasshoppers, crawfish and the like, constructed in accordance with the present invention. Apparatus 10 includes container 12, removable lid 14 and cover 16.

Container 12 is preferably composed of light weight synthetic resin material such as styrofoam and includes frusto-conical side wall 18 which tapers downwardly to circular bottom wall 20. Container 12 presents open top 22 and includes integral, marginal, circumscribing lip 24 extending from side wall 18 adjacent top 22. Rope handle 26 presents opposed knotted ends extending through respective openings defined in diametrically opposed lugs 28 extending from side wall 18 adjacent open top 22.

Lid 14 covers container top 22 and is similarly composed of light weight synthetic resin material such as styrofoam. Lid 14 is provided to prevent the bait from escaping from container 12 and keep debris, such as leaves or trash, out of container 12. However, lid 14 is susceptible to removal by strong winds or slight tilting of container 12.

Cover 16 is preferably cut from a flexible mesh material to present a circular peripheral edge 30. Although the preferred mesh material has approximately 280 apertures per square inch, it will be appreciated that the size of the apertures depicted in FIGS. 1–4 is exaggerated for purposes of illustration and that any netting which has apertures small enough to prevent the bait from passing therethrough is suitable. Cover 16 is sufficiently sized to enclose top 22 and at least a portion of side wall 18, with or without lid 14 being interposed between top 22 and cover 16, so that edge 30 is positioned about side wall 18 (FIGS. 1–3). Cover 16 is also sufficiently sized so that edge 30 may be positioned about side wall 18 while a portion of cover 16 is placed interiorly of container 12 to form a well for storing bait therein (FIG. 4).

Preferably, cover 16 is releasably secured about side wall 18 by an elastomeric band 32 having sufficient resiliency to tightly circumscribe side wall 18. Band 32 is preferably coupled with cover 16 by a stitched, closed loop 33 running along peripheral edge 30; band 32 being received within the stitched loop 33. Accordingly, band 32, coupled with cover 16, serves to secure peripheral edge 30 to side wall 18 once the user places peripheral edge 30 about side wall 18. Edge 30 may be secured about side wall 18 by other suitable means such as an elastomeric band that is not coupled with cover 16 but is placed about side wall 18 to encompass edge 30, a drawstring coupled with edge 30 which is drawn tightly by the user, or removable tacks or push-pins pushed by the user through cover 16 and into styrofoam side wall 18.

It will be appreciated that once band 32 is placed about side wall 18, the frusto-conical shape thereof cooperates with the resiliency of band 32 to inhibit upward slipping of band 32 and assist in maintaining peripheral edge 30 in a desired position along side wall 18. Of course, the frictional interengagement between side wall 18 and edge 30, which is enhanced by band 32, further inhibits slippage of edge 30 from desired positions along side wall 18. Additionally, lip 24 prevents band 18 from slipping beyond lip 24 and off side wall 18, which is particularly valuable when forming a well within container 12 or pouring water out of container 12. As will subsequently be described, edge 30 is shiftable along side wall 18 among a number of positions including a lid-retaining position (FIGS. 1), a water-replacing position (FIGS. 2–3) and a well-forming position (FIG. 4).

In the preferred lid-retaining method of the present invention, lid 14 is placed in position on container 12. The user stretches band 32 around side wall 18 and encloses top 22 and at least a portion of side wall 18 with cover 16. Cover 16 is then pulled downwardly until it is snug or taut relative to lid 14 and container 12 positioning peripheral edge 30 about side wall 18 in a lid-retaining position (FIG. 1). Finally, band 32 is placed about side wall 18 to secure edge 30 in the lid-retaining position and maintain the snug relationship. Of course, downwardly tapering side wall 18 inhibits upward slipping of peripheral edge 30 out of the lid-retaining position. Accordingly, cover 16 with edge 30 in the-lid-retaining position prevents lid 14 from being removed from container 12 such as by strong winds or slight tilting of container 12. Further, if container 12 tips over and lid 14 is detached sufficiently from container 12 to allow the contents to leak therefrom, meshed cover 16 permits the water to drain from container 12 while preventing escape of the bait therefrom.

Those skilled in the art will appreciate that the method for retaining lid 14 may also be accomplished by using a cover formed of a continuous sheet material rather than a mesh material; however, the meshed cover is preferred. Further, cover 16 may be sufficiently sized so that when edge 30 is pulled to the lid-retaining position, cover 16 encloses all of side wall 18. In such a case, edge 30 is placed along bottom wall 20 and the resiliency of band 38 prevents edge 30 from slipping onto side wall 18.

As illustrated in FIGS. 2–3, cover 16 also functions as a strainer when performing the water-replacing method. Similar to the lid-retaining method, cover 16 encloses uncovered top 22 (i.e., lid 14 is removed from container 12) and a portion of side wall 18. Subsequently, cover 16 is preferably pulled downwardly until it is taut relative to container 12 positioning edge 30 about side wall 18 in a water-replacing position, which is relatively closer to bottom wall 20 than the lid-retaining position. Once edge 30 has been secured about side wall 18 in the water-replacing position by placing band 32 about side wall 18, container 12 may be tilted to drain the water therefrom, as best shown in FIG. 3. Cover 16 serves as a strainer during drainage of container 12 so that the bait is retained within container 12 while the water is replaced. Once the bulk or all of the water has drained from container 12, container 12 may be filled with fresh water such as by pouring water through cover 16 or by submerging the entire container 12 in water.

It will be appreciated that the forces associated with pouring water out of container 12, along with the weight of the bait, cover 16 has a tendency to slip along side wall 18 towards top 22. Although the resiliency of band 32 cooperating with frusto-conical side wall 18 may not prevent such slippage, lip 24 prevents edge 30 from slipping entirely off side wall 18. Further, as those skilled in the art will appreciate, it is not necessary for cover 16 to be drawn tautly over top 22 and a portion of side wall 18 to perform the water-replacing method, as hereinabove described. The water in container 12 may be replaced with edge 30 relatively closer to top 22 so that cover 16 loosely encloses top 22 and a portion of side wall 18. However, a tautly drawn cover has proven more effective than a loose cover.

In the preferred well-forming method, lid 14 is removed so that a portion of cover 16 may droop interiorly of container 12 and serve as a well within which bait may be deposited to facilitate removal of the bait from container 12. The well is formed by stretching band 32 about side wall 18 and enclosing top 22 and a portion of side wall 18 with cover. A portion of cover 16 is then placed into container 12 so that part of the well formed thereby is submerged. Peripheral edge 30 is then secured about side wall 18 in a well-forming position (FIG. 4) by placing band 32 about side wall 18. Thereafter, the bait may be placed within the well. Of course, the user may shift edge 30 along side wall 18 from the preferred water-replacing position upwardly towards the well-forming position, thus eliminating the steps of stretching band 32 and enclosing top 22 and a portion of side wall 18. It will be appreciated that the well will also facilitate removal of bait not indigenous to water, such as grasshoppers; i.e., it is not necessary to submerge part of the well. Further, edge 30 is shiftable among a plurality of well-forming positions along side wall 18 to form a desired well dimension.

Although the invention has been described with reference to the preferred embodiment illustrated in the attached drawing figures, it is understood that substitutions may be made and equivalents employed herein without departing from the scope of the invention as recited in the claims. For example, although container 12 and lid 14 are preferably formed of a styrofoam material, the principles of the present invention are equally applicable to a bait container made of other materials such as metal, polyethylene or a similar lightweight, yet durable material. Additionally, it is entirely within the scope of the present invention to provide container 12 with a cylindrical (i.e., non-frustum shaped) or polygonal side wall. Furthermore, if a different means for securing cover 16 to side wall 18 is employed, such as a band not coupled with cover 16, the methods described hereinabove differ only slightly. That is, edge 30 is merely positioned along side wall 18 in the desired position without having to initially stretch band 32, cover 16 is then secured to side wall 18 by appropriate steps, such as placing the uncoupled band about side wall 18 to encompass cover 16 adjacent edge 30.

Having thus described the preferred embodiment of the present invention, the following is claimed as new and desired to be secured by Letters Patent.

What is claimed is:

1. In combination:
   a bait container having a top, side wall and bottom wall;
   a flexible cover composed of a mesh material and presenting a peripheral edge shiftable between a taut position in which said peripheral edge is positioned about said side wall and shifted towards said bottom wall sufficient for drawing said cover tautly over said top and at least a portion of said side wall, and a well-forming position in which said peripheral edge is shifted along said side wall towards said top sufficient to allow formation of a well of said cover within said container for storing bait therein and facilitating removal of bait from said container;
   securing means for releasably securing said peripheral edge about said side wall to maintain said peripheral edge in said taut and well-forming positions; and
   a removable lid received on said container to cover said top and positioned between said top and said cover so that said cover retains said lid on said container when said peripheral edge is shifted to said taut position.

2. The combination as set forth in claim 1,
   said securing means including an elastomeric band coupled with said cover along said peripheral edge, said band having sufficient resiliency for maintaining said peripheral edge in said taut and well-forming positions.

3. The combination as set forth in claim 2,
   said side wall presenting a frustum shape which tapers downwardly towards said bottom wall to inhibit upward slippage of said band along said side wall towards said top for maintaining said taut and well-forming positions.

4. The combination as set forth in claim 3,
   said container further having a lip projecting outwardly from said side wall adjacent said top to prevent slippage of said band off said side wall.

5. A method of retaining a removable lid on a pail-shaped bait container having a side wall, and a bottom wall comprising the steps of:
   (a) placing said lid on said container;
   (b) enclosing said lid and at least a portion of said side wall with a flexible cover;
   (c) pulling said cover downwardly into a snug relationship relative to said lid and container sufficiently for preventing removal of said lid; and
   (d) securing said cover to said container at a location along said side wall below said lid for maintaining said snug relationship for retaining said lid on said container.

6. The method as set forth in claim 5,
   step (a) including the step of filling said container with water and depositing bait therein before placing said lid on said container,
   step (b) including the step of providing said cover as a mesh material with a peripheral edge and an elastomeric band coupled with said cover along said peripheral edge, said mesh material being configured for allowing the water to drain from said container, while preventing the bait from escaping therefrom, said band having sufficient resiliency for maintaining sand snug relationship,
   step (b) further including the step of stretching said band around said side wall so that said cover encloses said lid and said at least a portion of said side wall, and
   step (d) including the step of placing said band about said side wall such that said cover is secured to said side wall; and
   (e) providing said container with a lip projecting outwardly from said side wall to prevent slipping of said band towards said lid beyond said lip, and
   said side wall presenting a frustum shape which tapers downwardly towards said bottom wall to inhibit upward slipping of said band towards said lid for maintaining said snug relationship.

7. The method as set forth in claim 5,
   step (a) including the step of filling said container with water and depositing bait therein before placing said lid on said container.

8. The method as set forth in claim 7,
   step (b) including the step of providing said cover as a mesh material configured for allowing the water to drain from said container, while preventing the bait from escaping therefrom.

9. The method as set forth in claim 5,
   step (d) including the step of providing an elastomeric band having sufficient resiliency for maintaining said snug relationship, and
   placing said band about said side wall to encompass at least a portion of said cover for securing said cover to said side wall.

10. The method as set forth in claim 9,
    said side wall presenting a frustum shape which tapers downwardly towards said bottom wall to inhibit upward slipping of said band towards said lid for maintaining said snug relationship.

11. The method as set forth in claim 9 further comprising;
    (e) providing said container with a lip projecting outwardly from said side wall to prevent slipping of said band towards said lid beyond said lip.

12. The method as set forth in claim 5, step (b) including the step of providing said cover with a peripheral edge and an elastomeric band coupled with said cover along said peripheral edge, said band having sufficient resiliency for maintaining said snug relationship, step (b) further including the step of stretching said band around said side wall so that said cover encloses said lid and said at least a portion of said side wall, and step (d) including the step of placing said band about said side wall such that said cover is secured to said side wall.

13. The method as set forth in claim 12, said side wall presenting a frustum shape which tapers downwardly towards said bottom wall to inhibit upward slipping of said band towards said lid for maintaining said snug relationship.

14. The method as set forth in claim 12 further comprising;

(e) providing said container with a lip projecting outwardly from said side wall to prevent slipping of said band towards said lid beyond said lip.

15. The method as set forth in claim 5, step (b) including the step of providing said cover with a peripheral edge and an elastomeric band coupled with said cover along said peripheral edge, said band having sufficient resiliency for maintaining said snug relationship, step (b) further including the step of stretching said band around said side wall so that said cover encloses said lid and said at least a portion of said side wall, step (c) including the step of configuring said cover such that when said cover is pulled to said snug relationship, said cover entirely encloses said side wall, and step (d) including the step of placing said band along the bottom wall wherein said resiliency of said band prevents said band from slipping onto and along said side wall.

16. A method of replacing water contained in a pail-shaped bait container having a top, a side wall, and a bottom wall comprising the steps of:

(a) enclosing said top of said container and at least a portion of said side wall with a flexible cover composed of a mesh material, said cover presenting a peripheral edge;

(b) securing said cover adjacent its peripheral edge to said container at a location along said side wall below said top;

(c) pouring water contained in said container through said cover so that said cover strains the bait and retains the bait within said container; and (d) filling said container with water through said cover.

17. The method as set forth in claim 16, step (a) including the step of pulling said cover into a taut relationship relative to said container so that said cover enclosing said top and said at least a portion of said side wall is taut.

18. The method as set forth in claim 17, step (b) including the step of providing an elastomeric band having sufficient resiliency for maintaining said taut relationship, and placing said band about said side wall to encompass said cover adjacent said peripheral edge.

19. The method as set forth in claim 18, said side wall presenting a frustum shape which tapers downwardly towards said bottom wall to inhibit upward slipping of said band towards said top for maintaining said taut relationship.

20. The method as set forth in claim 18 further comprising;

(e) providing said container with a lip projecting outwardly from said side wall to prevent slipping of said band towards said top beyond said lip.

21. The method as set forth in claim 17, step (a) including the step of providing said cover with an elastomeric band coupled with said cover along said peripheral edge, said band having sufficient resiliency for maintaining said taut relationship, step (a) further including the step of stretching said band around said side wall so that said cover encloses said top and said at least a portion of said side wall, and step (b) including the step of placing said band about said side wall such that said cover is secured to said side wall.

22. The method as set forth in claim 21, said side wall presenting a frustum shape which tapers downwardly towards said bottom wall to inhibit upward slipping of said band towards said top for maintaining said taut relationship.

23. The method as set forth in claim 21 further comprising;

(e) providing said container with a lip projecting outwardly from said side wall to prevent slipping of said band towards said top beyond said lip.

24. The method as set forth in claim 16, step (a) including the step of pulling said cover into a taut relationship relative to said container so that said cover enclosing said top and said at least a portion of said side wall is taut, step (a) further including the step of providing said cover with an elastomeric band coupled with said cover along said peripheral edge, said band having sufficient resiliency for maintaining said taut relationship, step (a) further including the step of stretching said band around said side wall so that said cover encloses said top and said at least a portion of said side wall, and step (b) including the step of placing said band about said side wall such that said cover is secured to said side wall; and (e) providing said container with a lip projecting outwardly from said side wall to prevent slipping of said band towards top beyond said lip, and said side wall presenting a frustum shape which tapers downwardly towards said bottom wall to inhibit upward slipping of said band towards said top for maintaining said taut relationship.

* * * * *